(12) United States Patent
Calundann et al.

(10) Patent No.: US 8,013,026 B2
(45) Date of Patent: Sep. 6, 2011

(54) PROTON-CONDUCTING MEMBRANE AND THE USE OF THE SAME

(76) Inventors: Gordon Calundann, North Plainfield, NJ (US); Michael J. Sansone, Berkeley Heights, NJ (US); Oemer Uensal, Mainz (DE); Joachim Kiefer, Losheim Am See (DE)

( * ) Notice: Subject to any disclaimer, the term of this patent is extended or adjusted under 35 U.S.C. 154(b) by 0 days.

(21) Appl. No.: 12/721,088

(22) Filed: Mar. 10, 2010

(65) Prior Publication Data

US 2010/0167163 A1  Jul. 1, 2010

Related U.S. Application Data

(62) Division of application No. 10/489,385, filed as application No. PCT/EP02/09629 on Aug. 29, 2002, now abandoned.

(30) Foreign Application Priority Data

Sep. 12, 2001 (DE) .................................. 101 44 815

(51) Int. Cl.
  *B01J 49/00* (2006.01)
  *H01M 8/10* (2006.01)
(52) U.S. Cl. .......................................... 521/27; 429/492
(58) Field of Classification Search .................... 521/27; 429/492
  See application file for complete search history.

(56) References Cited

U.S. PATENT DOCUMENTS

| | | | |
|---|---|---|---|
| 4,005,012 A | 1/1977 | Wrasidlo | |
| 4,120,096 A | 10/1978 | Keller | |
| 4,927,909 A | 5/1990 | Wadhwa et al. | |
| 5,304,305 A | 4/1994 | Lehrer | |
| 5,525,436 A | 6/1996 | Savinell et al. | |
| 5,626,324 A | 5/1997 | Nakamura et al. | |
| 5,693,227 A | 12/1997 | Costa | |
| 5,945,233 A | 8/1999 | Onorato et al. | |
| 2001/0038937 A1 | 11/2001 | Suzuki et al. | |
| 2004/0186189 A1 | 9/2004 | Muller et al. | |

FOREIGN PATENT DOCUMENTS

| | | |
|---|---|---|
| WO | WO-00/39202 A1 | 7/2000 |
| WO | WO-00/44816 A1 | 8/2000 |
| WO | WO-01/94450 A2 | 12/2001 |
| WO | WO-02/071518 A1 | 9/2002 |

OTHER PUBLICATIONS

Osaheni et al. "Synthesis and Processing of Heterocyclic Polymers as Electronic and Nonlinear Optical materials. 4. New Conjugated Rigid-Rob Poly(benzobis(imidazole))s", Macromolecules, 1995, 28, 1172-1179.*

J. Osaheni et al. "Synthesis and Processing of Heterocyclic Polymers as Electronic Optoelectronic and Nonlinear Optical Members. 4. New conjugated Rigid-Rod Poly(benzobis(imidazole))s", Macromolecules, No. 4, 1995, 28, 1172-1179.

J. Osaheni et al. Synthesis and Processing of Heterocyclic Polymers as Electronic, Optoelectronic, and Nonlinear Optical Materials. 1. New Conjugated Rigid-Rod Benzobisthiazole Polymers. Jul. 28, 1992, 1282-1290.

S. Jenekhe, "Complexation-Mediated Solubilization and Processing of Rigid-Chain and Ladder Polymers in Aprotic Organic Solvents." Mar. 26, 1990, 4419-4429.

S. Jenekhe, Solubilization, Solutions, and Processing of Aromatic Heterocyclic Rigid Rods Polymers in Aprotic Organic Solvents: Poly(p-phenylene-2,6-benzobisthiazolediyl) (PBT), Jan. 17, 1989, 3216-3222.

* cited by examiner

*Primary Examiner* — Michael M Bernshteyn
(74) *Attorney, Agent, or Firm* — Connolly Bove Lodge & Hutz LLP

(57) ABSTRACT

The present invention relates to a novel proton-conducting polymer membrane based on polyazoles which can, because of its excellent chemical and thermal properties, be used in a variety of ways and is particularly useful as polymer electrolyte membrane (PEM) to produce membrane electrode units for PEM fuel cells.

23 Claims, No Drawings

PROTON-CONDUCTING MEMBRANE AND THE USE OF THE SAME

CROSS-REFERENCE TO RELATED APPLICATIONS

This application is a divisional application of U.S. Ser. No. 10/489,385 filed Oct. 21, 2004 which is incorporated by reference in its entirety and is a national stage application (under 35 U.S.C. §371) of PCT/EP2002/09629, filed Aug. 29, 2002, which claims benefit of German application 101 44 815.5 filed Sep. 12, 2001.

The present invention relates to a novel proton-conducting polymer membrane based on polyazoles which can, because of its excellent chemical and thermal properties, be used in a variety of ways and is particularly useful as polymer electrolyte membrane (PEM) in PEM fuel cells.

Polyazoles such as polybenzimidazoles (®Celazole) have been known for a long time. The preparation of such polybenzimidazoles (PBI) is usually carried out by reacting 3,3', 4,4'-tetraaminobiphenyl with isophthalic acid or diphenylisophthalic acid or their esters in a solid-phase polymerization. The prepolymer formed solidifies in the reactor and is subsequently comminuted mechanically. The pulverulent prepolymer is subsequently fully polymerized at temperatures of up to 400° C. to give the desired polybenzimidazoles.

To produce polymer films, the FBI is dissolved in polar, aprotic solvents such as dimethylacetamide (DMAc) and a film is produced by classical methods.

Proton-conducting, i.e. acid-doped, polyazole membranes for use in PEM fuel cells are already known. The basic polyazole films are doped with concentrated phosphoric acid or sulfuric acid and then act as proton conductors and separators in polymer electrolyte membrane fuel cells (PEM fuel cells).

Due to the excellent properties of the polyazole polymer, such polymer electrolyte membranes can, when converted into membrane-electrode units (MEEs), be used in fuel cells at continuous operating temperatures above 100° C., in particular above 120° C. This high continuous operating temperature allows the activity of the catalysts based on noble metals present in the membrane-electrode unit (MEE) to be increased. Particularly when using reforming products from hydrocarbons, significant amounts of carbon monoxide are present in the reformer gas and these usually have to be removed by means of a complicated gas work-up or gas purification. The ability to increase the operating temperature makes it possible to tolerate significantly higher concentrations of CO impurities in long-term operation.

The use of polymer electrolyte membranes based on polyazole polymers enables, firstly, the complicated gas work-up or gas purification to be omitted, at least in part, and, secondly, allows the catalyst loading in the membrane-electrode unit to be reduced. Both are indispensable prerequisites for wide use of PEM fuel cells since otherwise the costs of a PEM fuel cell system are too high.

The previously known acid-doped polymer membranes based on polyazoles display an advantageous property profile. However, an overall improvement in these properties has to be achieved in order to be able to use PEM fuel cells in the intended applications, in particular in the automobile sector and in decentralized power and heat generation (stationary applications). In addition, the polymer is membranes known hitherto have a high content of dimethylacetamide (DMAc) which cannot be removed completely by means of known drying methods. The German patent application No. 10109829.4 describes a polymer membrane based on polyazoles in the case of which the DMAc contamination was eliminated. Although such polymer membranes display improved mechanical properties, the specific conductivity does not exceed 0.1 S/cm at 120° C.).

It is an object of the present invention to provide acid-doped polymer membranes based on polyazoles which, firstly, have the use advantages of the polymer membrane based on polyazoles and, secondly, display an increased specific conductivity, in particular at operating temperatures above 100° C., and additionally make do without humidification of the fuel gas.

We have now found that a proton-conducting membrane based on polyazoles can be obtained when the commercially available polyazole polymer is dissolved in polyphosphoric acid to produce the membrane.

In the case of this novel membrane, the specific after-treatment described in the German patent application No. 10109829.4 can be dispensed with. The doped polymer membranes display a significantly improved proton conductivity and the subsequent doping of the film is dispensed with.

The present invention provides a proton-conducting polymer membrane based on polyazoles which is obtainable by a process comprising the steps
A) Dissolution of the polyazole polymer in polyphosphoric acid,
B) Heating of the solution obtainable as described in step A) to temperatures of up to 400° C., preferably up to 350° C., in particular up to 300° C., under inert gas,
C) Formulation of a membrane on a support using the solution of the polyazole polymer from step B), and
D) Treatment of the membrane formed in step C) until it is self-supporting.

The polymers used in step A) comprise recurring azole units of the formula (I) and/or (II)

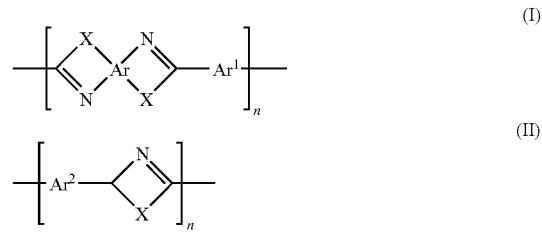

where
Ar are identical or different and are each a tetravalent aromatic or heteroaromatic group which may have one or more rings,
Ar¹ are identical or different and are each a divalent aromatic or heteroaromatic group which may have one or more rings,
Ar² are identical or different and are each a divalent or trivalent aromatic or heteroaromatic group which may have one or more rings,
X are identical or different and are each oxygen, sulfur or an amino group bearing a hydrogen atom, a group having 1-20 carbon atoms, preferably a branched or unbranched alkyl or alkoxy group, or an aryl group as further radical.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, anthracene and phenanthrene, which may also be substituted.

Ar¹ can have any substitution pattern; in the case of phenylene for example, Ar¹ can be ortho-, meta- or para-phenylene. Particularly preferred groups are derived from benzene and biphenyls, which may also be substituted.

Preferred alkyl groups are short-chain alkyl groups having from 1 to 4 carbon atoms, e.g. methyl, ethyl, n-propyl or i-propyl and t-butyl groups.

Preferred aromatic groups are phenyl or naphthyl groups. The alkyl groups and the aromatic groups may be substituted.

Preferred substituents are halogen atoms such as fluorine, amino groups or short-chain alkyl groups such as methyl or ethyl groups.

Preference is given to polyazoles comprising recurring units of the formula (I) in which the radicals X are identical within a recurring unit.

The polyazoles can in principle also comprise different recurring units which differ, for example, in their, radical X. However, they preferably have only identical radicals X in a recurring unit.

In a further embodiment of the present invention, the polymer comprising recurring azole units is a copolymer comprising at least two units of the formula (I) and/or (II) which differ from one another. The polymers can be present as block copolymers (diblock, triblock), random copolymers, periodic copolymers and/or alternating polymers.

In a particularly preferred embodiment of the present invention, the polymer comprising recurring azole units is a polyazole which contains only units of the formula (I) and/or (II).

The number of recurring azole units in the polymer is preferably greater than or equal to 10. Particularly preferred polymers have at least 100 recurring azole units.

For the purposes of the present invention, polymers comprising recurring benzimidazole units are preferred. Some examples of the extremely advantageous polymers comprising one or more recurring benzimidazole units have the following formulae:

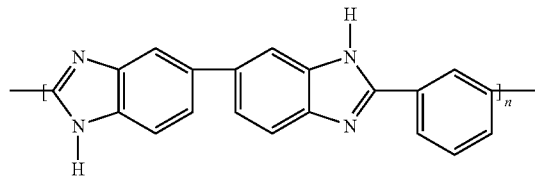
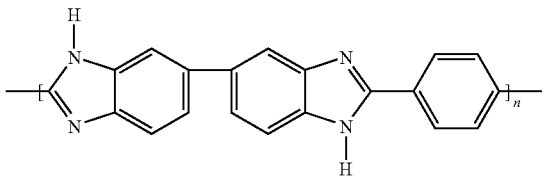
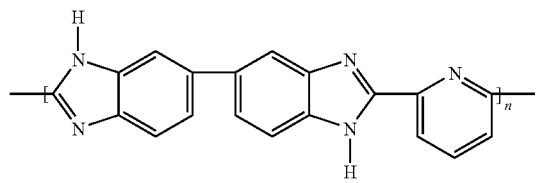
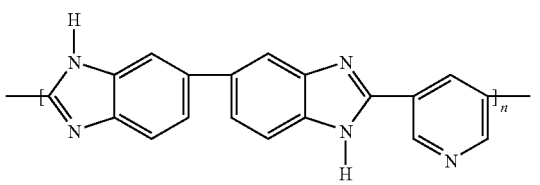
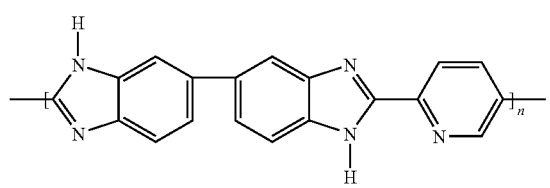
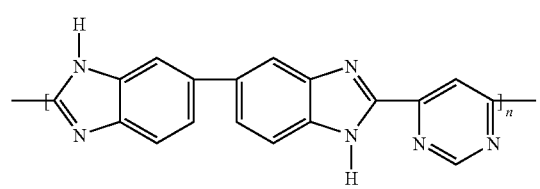
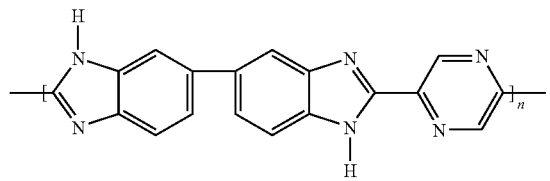
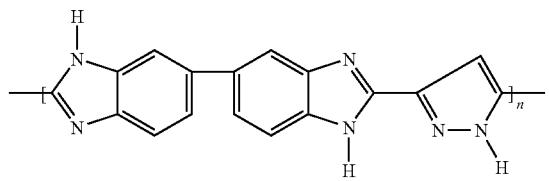
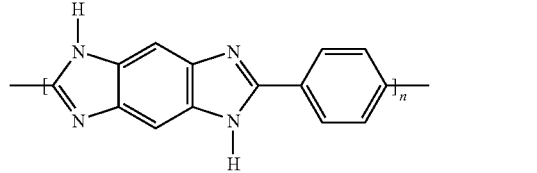
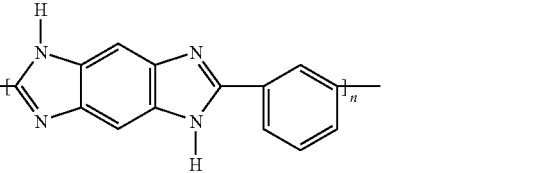
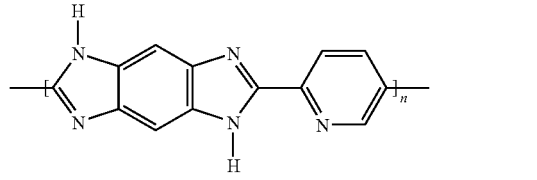
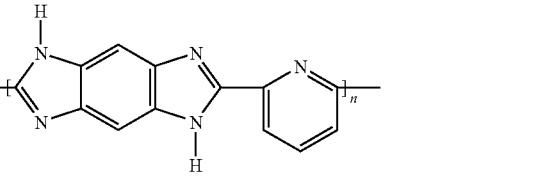

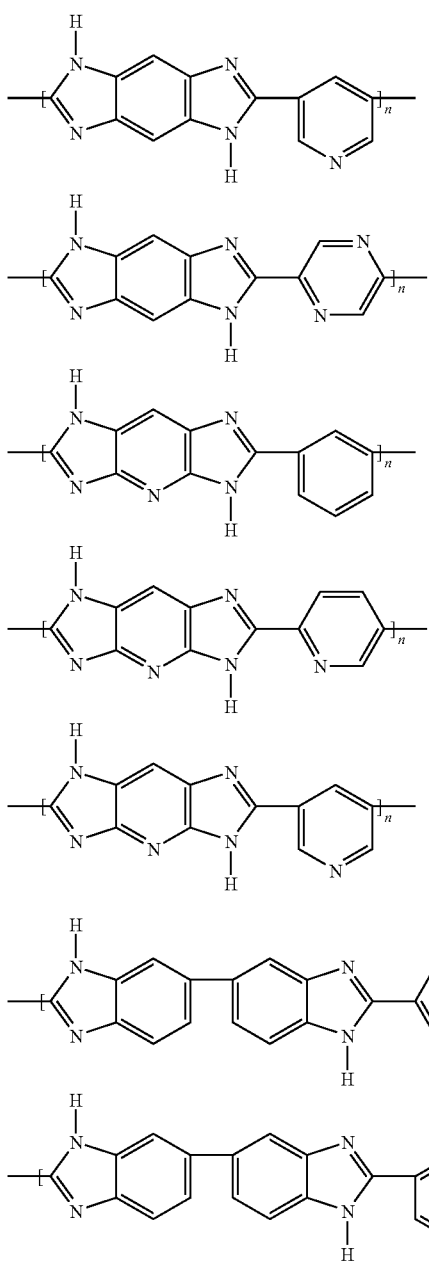
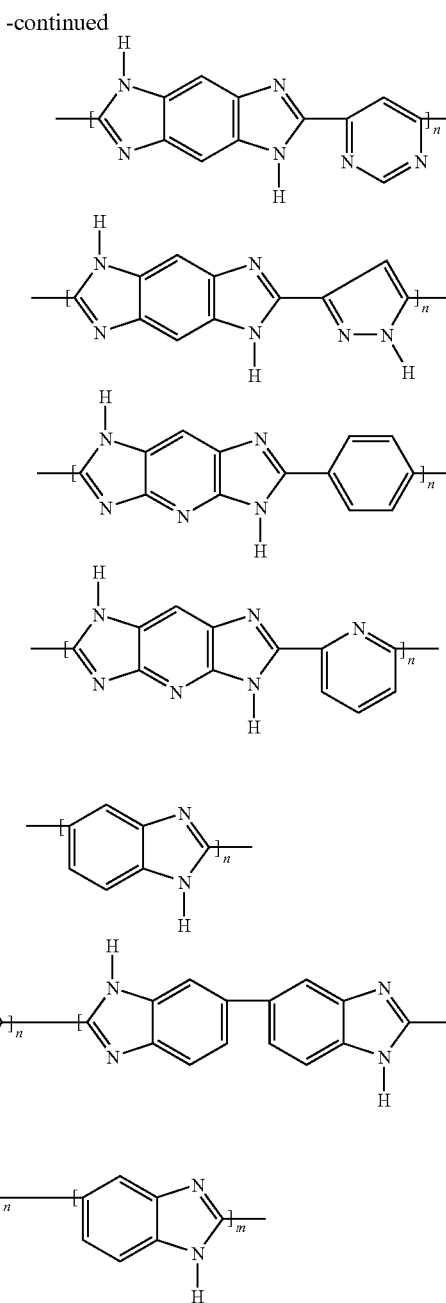

where n and m are each an integer greater than or equal to 10, preferably greater than or equal to 100.

The polyazoles used, but in particular the polybenzimidazoles, have a high molecular weight. Measured as the intrinsic viscosity, this is at least 0.2 dl/g, preferably from 0.2 to 3 dl/g.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

The polyphosphoric acid used in step A) is commercially available polyphosphoric acid as can be obtained, for example, from Riedel-de-Haen. The polyphosphoric acids $H_{n+2}P_nO_{3n+1}$ (n>1) usually have an assay calculated as $P_2O_5$ (acidimetric) of at least 83%. In place of a solution of the prepolymer, a dispersion/suspension can also be produced.

The mixture produced in step A) has a weight ratio of polyphosphoric acid to polyazole polymer of from 1:10 000 to 10 000:1, preferably from 1:1 000 to 1 000:1, in particular from 1:100 to 100:1.

The formation of the polymer membrane in step C) is carried out by means of measures (casting, spraying, doctor blade coating, extrusion) which are known per se from the prior art for polymer film production. As supports, it is possible to use all supports which are inert under the conditions employed. To adjust the viscosity, the solution can, if necessary, be admixed with dilute or concentrated phosphoric acid (concentrated phosphoric acid, 85%) and/or water. In this way, the viscosity can be set to the desired value and the formation of the membrane can be made easier. The thickness is from 20 to 2000 μm, preferably from 30 to 1500 μm, in particular from 50 to 1200 μm.

The temperature of the heated solution is up to 400° C., preferably from 150 to 350° C., in particular from 190 to 300° C.

The membrane produced in step C) is treated at elevated temperatures in the presence of moisture for a sufficient time until the membrane is self-supporting, so that it can be detached from the support without damage (step D).

The treatment of the membrane in step D) is carried out at temperatures above 0° C. and less than 150° C., preferably at temperatures of from 10° C. to 120° C., in particular from room temperature (20° C.) to 90° C., in the presence of moisture or water, dilute phosphoric acid and/or water vapor. The treatment is preferably carried out at atmospheric pressure, but can also be carried out at superatmospheric pressure. It is important for the treatment to occur in the presence of sufficient moisture so that the polyphosphoric acid present contributes to strengthening of the membrane as a result of partial hydrolysis to form low molecular weight polyphosphoric acid and/or phosphoric acid.

The partial hydrolysis of the polyphosphoric acid in step D) leads to strengthening of the membrane and to a decrease in the thickness and formation of a membrane having a thickness of from 15 to 400 µm, preferably from 20 to 200 µm, in particular from 20 to 150 µm, which is self-supporting.

The intramolecular and intermolecular structures (e.g. networks of the polyazole with the polyphosphoric acid) present in the polyphosphoric acid lead to ordered membrane formation which is responsible for the particular properties of the membrane formed.

The upper temperature limit for the treatment in step D) is generally 150° C. If moisture is present for an extremely short time, for example in the case of superheated steam, this steam can also be hotter than 150° C. The important factor in determining the upper temperature limit is the duration of the treatment.

The partial hydrolysis (step D) can also be carried out in temperature- and humidity-controlled chambers so that the hydrolysis can be controlled in a targeted manner in the presence of a defined amount of moisture. The amount of moisture can in this case be set in a targeted manner by means of the temperature or saturation of the environment in phosphoric contact with the membrane, for example gases such as air, nitrogen, carbon dioxide or other suitable gases, steam and/or dilute acid. The treatment time is dependent on the above parameters chosen.

Furthermore, the treatment time is dependent on the thickness of the membrane.

The treatment time is generally in the range from a few seconds to some minutes, for example under the action of superheated steam, or up to a number of days, for example in air at room temperature and a low relative atmospheric humidity. The treatment time is preferably from 10 seconds to 300 hours, in particular from 1 minute to 200 hours.

If the partial hydrolysis is carried out at room temperature (20° C.) using ambient air having a relative atmospheric humidity of 40-80%, the treatment time is from 1 to 200 hours.

The membrane obtained in step D) is self-supporting, i.e. it can be detached from the support without damage and subsequently be processed further immediately if desired.

The concentration of phosphoric acid and thus the conductivity of the polymer membrane according to the invention can be set via the degree of hydrolysis, i.e. the time, temperature and ambient moisture level. According to the invention, the concentration of phosphoric acid is reported as mole of acid per mole of repeating units of the polymer. For the purposes of the present invention, a concentration (mole of phosphoric acid per repeating unit of the formula (III), i.e. polybenzimidazole) of from 10 to 35, in particular from 12 to 20, is preferred. Such high degrees of doping (concentrations) are very difficult or impossible to achieve by doping polyazoles with commercially available ortho-phosphoric acid and lead to the loss of mechanical integrity.

Subsequent to the treatment as described in step D), the membrane can be crosslinked on the surface by action of heat in the presence of atmospheric oxygen. This hardening of the membrane surface effects an additional improvement in the properties of the membrane.

Crosslinking can also be achieved by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in this case in the range from 5 to 200 kGy.

The polymer membrane of the invention has improved materials properties compared to the doped polymer membranes known hitherto. In particular, it displays improved performance compared to known doped polymer membranes. This is due, in particular, to an improved proton conductivity.

This is at least 0.1 S/cm, preferably at least 0.12 S/cm, at a temperature of 120° C.

To achieve a further improvement in the use properties, fillers, in particular proton-conducting fillers, and also additional acids can be additionally added to the membrane. The addition can be carried out either during step A or B.

Nonlimiting examples of proton-conducting fillers are

Sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, Phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites ($NH_4+$), sheet silicates, network silicates, H-natrolites, H-mordenites, $NH_4$-analcines, $NH_4$-sodalites, $NH_4$-gallates, H-montmorilonites Acids such as $HClO_4$, $SbF_5$ Fillers such as carbides, in particular SiC, $Si_3N_4$, fibers, in particular glass fibers, glass powders and/or polymer fibers, preferably those based on polyazoles.

This membrane can also further comprise perfluorinated sulfonic acid additives (0.1-20% by weight, preferably 0.2-15% by weight, very particularly preferably 0.2-10% by weight). These additives lead to a performance improvement, in the vicinity of the cathode to an increase in the oxygen solubility and oxygen diffusion and to a decrease in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and perfluorosulfonimide as an additive in phosphoric acid fuel cell. Razaq, M.;

Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are:

Trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can further comprise additives which scavenge (primary antioxidants) or destroy (secondary antioxidants) the peroxide radicals generated by reduction of oxygen in operation and thereby increase the life and stability of the membrane and membrane electrode unit, as described in JP2001118591 A2. The molecular structures of such additives and the way in which they function are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:

bis(trifluoromethyl) nitroxide, 2,2-diphenyl-1-picrinylhydrazyl, phenols, alkylphenols, sterically hindered alkylphenols such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl-2-nitrosopropane, benzophenone, benzaldehyde tert-butylnitrone, cysteamine, melamines, lead oxides, manganese oxides, nickel oxides, cobalt oxides.

The possible fields of use of the doped polymer membranes according to the invention include, inter alia, use in fuel cells, in electrolysis, in capacitors and in battery systems. Owing to their property profile, the doped polymer membranes are preferably used in fuel cells.

The present invention also relates to a membrane-electrode unit comprising at least one polymer membrane according to the invention. For further information on membrane-electrode units, reference may be made to the specialist literature, in particular the U.S. Pat. No. 4,191,618, U.S. Pat. No. 4,212,714 and U.S. Pat. No. 4,333,805. The disclosure in the above-mentioned references [U.S. Pat. No. 4,191,618, U.S. Pat. No. 4,212,714 and U.S. Pat. No. 4,333,805] regarding the structure and production of membrane-electrode units and the electrodes, gas diffusion layers and catalysts to be chosen is hereby incorporated by reference into the present description.

In one variant of the present invention, the membrane can be formed directly on the electrode rather than on a support. The treatment in step D) can be shortened in this way, since the membrane no longer has to be self-supporting. Such a membrane is also subject matter of the present invention.

The present invention further provides an electrode provided with a proton-conducting polymer coating based on polyazoles which is obtainable by a process comprising the steps A) Dissolution of the polyazole polymer in polyphosphoric acid, B) Heating of the solution obtainable as described in step A) to temperatures of up to 400° C., preferably up to 350° C., in particular of up to 300° C. under inert gas, C) Application of a layer to an electrode using the solution of the polyazole polymer from step B), and D) Treatment of the layer formed in step C).

The coating has a thickness of from 2 to 300 μm, preferably from 5 to 250 μm in particular from 10 to 100 μm.

The above-described variants and preferred embodiments are also applicable to this electrode, so that they will not be repeated at this point.

An electrode which has been coated in this way can be incorporated in a membrane-electrode unit which may, if desired, comprise at least one polymer membrane according to the invention.

In a further variant, a catalytically active layer can be applied to the membrane of the invention and this can be joined to a gas diffusion layer. For this purpose, a membrane is formed in accordance with the steps A) to ID) and the catalyst is applied. These structures are also subject matter of the present invention.

Furthermore, the formation of the membrane in accordance with the steps A) to D) can also be carried out on a support or a support film on which the catalyst is already present. After removal of the support or the support film, the catalyst is located on the membrane according to the invention. These structures are also subject matter of the present invention.

The present invention likewise provides a membrane-electrode unit which comprises at least one coated electrode and/or at least one polymer membrane according to the invention in combination with a further polymer membrane based on polyazoles or a polymer blend membrane comprising at least one polymer based on polyazoles. In the present context, a polyazole is a polymer comprising recurring azole units of the formula (I) and/or Op, in particular of the formula (III).

General Measurement Methods:

Method of Measuring the IEC

The conductivity of the membrane is dependent to a high degree on the content of acid groups expressed by the ion exchange capacity (IEC). To measure the ion exchange capacity, a specimen having a diameter of 3 cm is stamped out and placed in a glass beaker filled with 100 ml of water. The acid liberated is titrated with 0.1 M NaOH. The specimen is subsequently taken out, excess water is dabbed off and the specimen is dried at 160° C. for 4 hours. The dry weight, $m_0$, is then determined gravimetrically to a precision of 0.1 mg. The ion exchange capacity is then calculated from the consumption of 0.1 M NaOH to the first titration end point, $V_1$ in ml, and the dry weight, $m_0$ in mg, according to the following formula:

$$IEC = V_1 * 300 / m_0$$

Method of Measuring the Specific Conductivity

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before installation of the specimen. To measure the temperature dependence, the measurement cell is brought to the desired temperature in an oven and the temperature is regulated via a Pt-100 resistance thermometer positioned in the immediate vicinity of the specimen. After the desired temperature has been reached, the specimen is held at this temperature for 10 minutes before commencement of the measurement.

EXAMPLES

Membrane Production 10 g of polybenzimidazole (FBI) having an inherent viscosity (IV) of 0.92 dl/g obtained from the manufacturing plant in Rock Hill, USA, are placed in a 100 ml three-necked flask equipped with a mechanical stirrer, nitrogen inlet and outlet, 90 g of polyphosphoric acid ($P_2O_5$ content=83.4%, determined by analysis) are added thereto. This mixture is heated to 270° C. and maintained at this temperature for 14 hours. The FBI polymer dissolves completely in the PPA, but the 10% PBI/PPA solution is very viscous. At this temperature, 33.33 g of an 85% phosphoric acid are added. The mixture obtained in this way is cooled to 240° C. over a period of 1 hour while stirring, forming a homogeneous, pourable solution. The resulting 7.5% strength FBI solution in 106.9% PPA is applied at 240° C. by means of a doctor blade to glass plates which have previously been heated to 100° C. Films having a thickness of from 150 μm and 200 μm were applied by means of a doctor blade. These films were then allowed to stand at room temperature under ambient conditions for 3 days. Absorption of moisture from the air results in hydrolysis of polyphosphoric acid to phosphoric acid. Excess phosphoric acid is dabbed off and a mechanical stable membrane consisting of the PBI/polyphosphoric acid/phosphoric acid system is obtained.

To determine the inherent viscosity, part of the solution after the heat treatment is precipitated by mixing with distilled water. The resin-like product obtained in this way is filtered off, washed three times with distilled water in a kneader, neutralized with ammonia hydroxide, washed three more times with water and subsequently dried at 120° C. and 1 torr for 16 hours to give a FBI powder. The FBI powder is dissolved at a concentration of 0.4% by weight in 96% sulfuric acid and the inherent viscosity is then determined by means of an Ubbelohde viscometer in a bath maintained at 25° C., giving a value of 1.68 dl/g.

Determination of the Membrane Properties

To determine the acid content, the membranes are placed in a glass beaker filled with water and the acid liberated is titrated against 0.1 molar sodium hydroxide solution. After the titration, the membranes are dried at 150° C. for 4 hours in a drying oven. The dry weight $m_0$ is then determined. The acid content, measured as the ratio of the molar amount of $H_3PO_4$ per repeating unit of polybenzimidazole (molar mass of PBI=308 mol/g), is calculated from the amount of alkali consumed up to the equivalence point and $m_0$.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated via a Pt-100 resistance thermometer positioned in the immediate vicinity of the specimen.

After the temperature has been reached, the specimen is maintained at this temperature for 10 minutes before commencement of the measurement.

The properties of the membranes according to the invention are summarized in table 1.

| Membrane | Membrane thickness after doctor blade coating [μm] | $n(H_3PO_4)/n(PBI)$ | Measurement temperature | Specific conductivity [S/cm] |
|---|---|---|---|---|
| 1 | 150 | 13.2 | 25 | 0.115 |
|   |     |      | 40 | 0.099 |
|   |     |      | 60 | 0.074 |
|   |     |      | 80 | 0.081 |
|   |     |      | 100 | 0.101 |
|   |     |      | 120 | 0.118 |
|   |     |      | 140 | 0.126 |
|   |     |      | 160 | 0.128 |
| 2 | 200 | 14 | 25 | 0.115 |
|   |     |    | 40 | 0.087 |
|   |     |    | 60 | 0.071 |
|   |     |    | 80 | 0.080 |
|   |     |    | 100 | 0.100 |
|   |     |    | 120 | 0.115 |
|   |     |    | 140 | 0.124 |
|   |     |    | 160 | 0.126 |

The invention claimed is:

1. A process to produce proton-conducting polymer membrane based on polyazoles comprising the steps
   A) dissolving a polyazole polymer in polyphosphoric acid to form a solution,
   B) heating the solution obtained as described in step A) to temperatures of up to 400° C., under inert gas,
   C) formulating a membrane on a support using the solution of the polyazole polymer from step B), and
   D) treating the membrane formed in step C) in the presence of moisture at temperatures and for a time which are sufficient for the membrane to become self-supporting so that it can be detached from the support without damage, wherein the polyphosphoric acid used in step A) has an assay calculated as $P_2O_5$ (acidimetric) of at least 85%.

2. The process as claimed in claim 1, wherein a dispersion/suspension instead of a solution of the polymer is produced in step A).

3. The process as claimed in claim 1, wherein the polymer used in step A) comprises recurring azole units of the formula (I) and/or

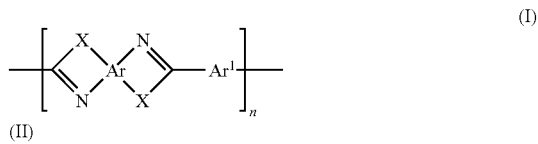

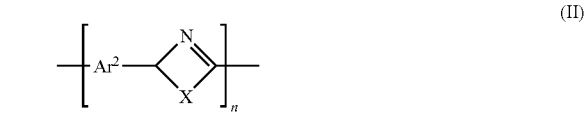

where
  Ar are identical or different and are each a tetravalent aromatic or heteroaromatic group which may have one or more rings,
  $Ar^1$ are identical or different and are each a divalent aromatic or heteroaromatic group which may have one or more rings, Ar² are identical or different and are each a divalent or trivalent aromatic or heteroaromatic group which may have one or more rings, X are identical or different and are each oxygen, sulfur or an amino group bearing a hydrogen atom, a group having 1-20 carbon atoms, a branched or unbranched alkyl or alkoxy group, and an aryl group as further radical.

4. The process as claimed in claim 3, wherein

X are identical or different and a branched or unbranched alkyl or alkoxy group.

5. The process as claimed in claim 1, wherein a polymer selected from the group consisting of polybenzimidazole, poly(pyridines), poly(pyrimidines), polyimidazoles, polybenzothiazoles, polybenzoxazoles, polyoxadiazoles, polyquinoxalines, polythiadiazoles and poly(tetrazapyrenes) is used in step A).

6. The process as claimed in claim 1, wherein the polymer used in step A) comprises one or more recurring benzimidazole units of the formula

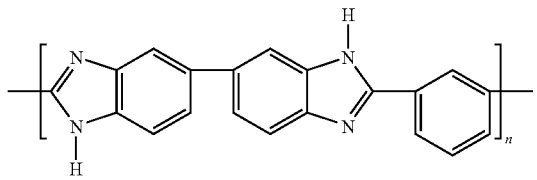
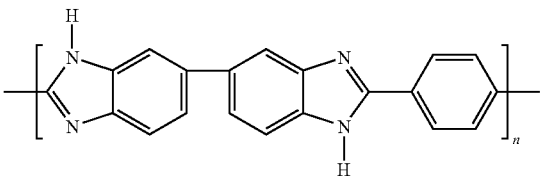
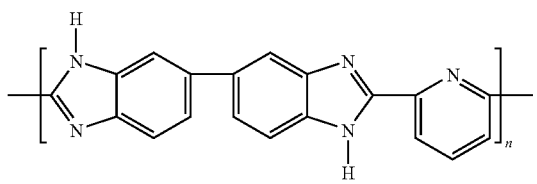
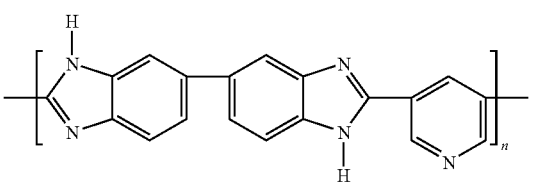
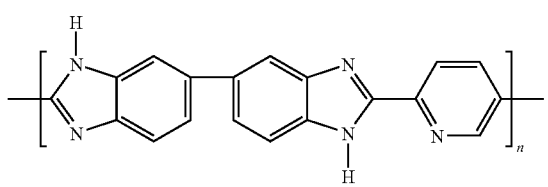
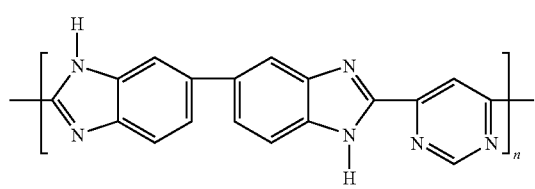
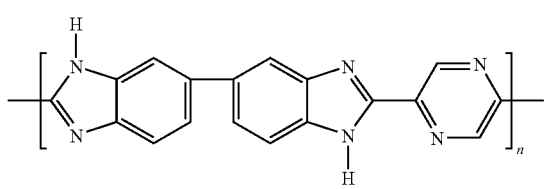
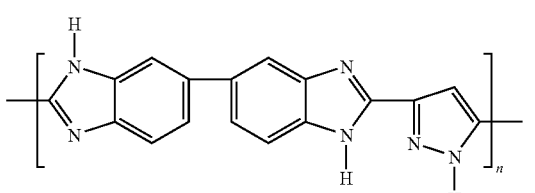
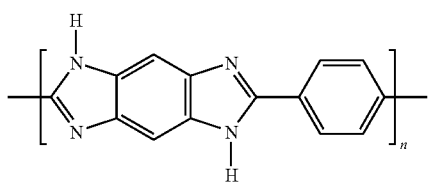
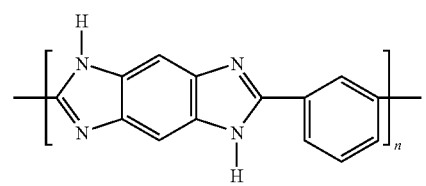
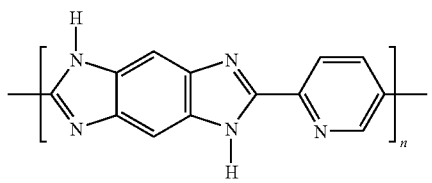
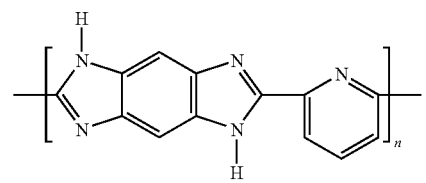
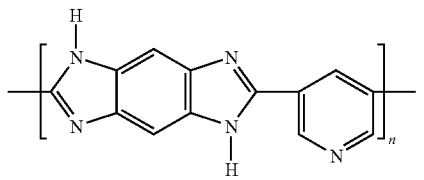
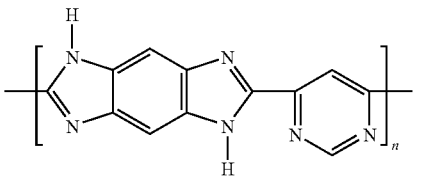

-continued

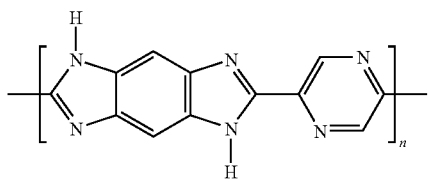

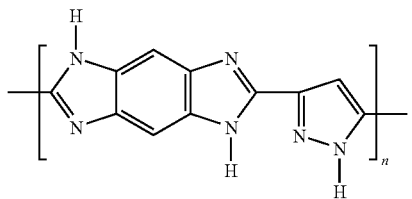

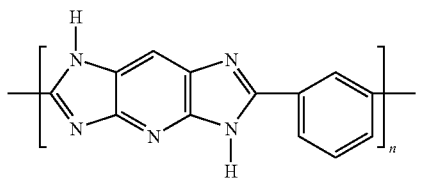

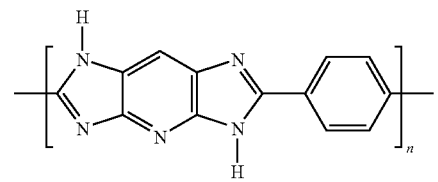

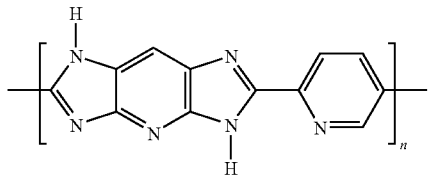

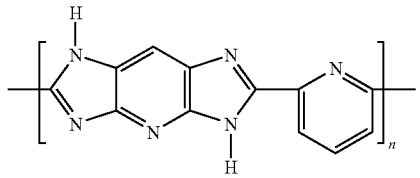

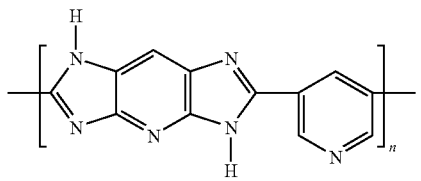

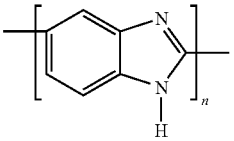

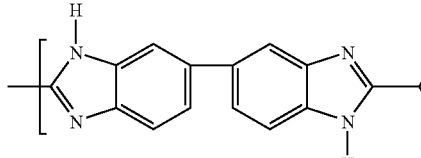

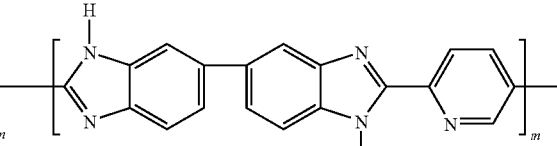

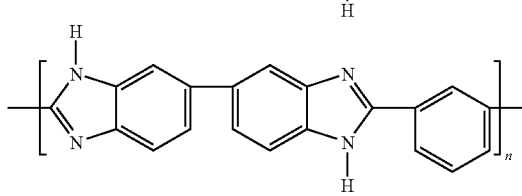

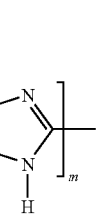

where n and m are each an integer greater than or equal to 10.

7. The process as claimed in claim 6, wherein n and m are each an integer greater than or equal to 100.

8. The process as claimed in claim 1, wherein the viscosity is adjusted by addition of phosphoric acid after step B) and before step C).

9. The process as claimed in claim 1, wherein the membrane produced in step C) is treated in the presence of moisture at temperatures and for a time until the membrane is self-supporting and can be detached from the support without damage.

10. The process as claimed in claim 1, wherein the treatment of the membrane in step D) is carried out at temperatures of from greater than 0° C. to 150° C. in the presence of moisture or water, dilute phosphoric acid and/or water vapor.

11. The process as claimed in claim 10, wherein the treatment of the membrane in step D) is carried out at temperatures of from 10° C. to 120° C.

12. The process as claimed in claim 11, wherein the treatment of the membrane in step D) is carried out at temperatures of from room temperature (20° C.) to 90° C.

13. The process as claimed in claim 1, wherein the treatment of the membrane in step D) is carried out for from 10 second to 300 hours.

14. The process as claimed in claim 13, wherein the treatment of the membrane in step D) is carried out for from 1 minute to 200 hours.

15. The process as claimed in claim 1, wherein subsequent to the treatment in step D) the membrane is crosslinked by action of IR or NIR.

16. The process as claimed in claim 1, wherein an electrode is chosen as the support in step C).

17. The process as claimed in claim 1, wherein the membrane formed in step C) has a thickness of from 20 to 2000 μm.

18. The process as claimed in claim 17, wherein the membrane formed in step C) has a thickness of from 30 to 1500 μm.

19. The process as claimed in claim 18, wherein the membrane formed in step C) has a thickness of from 50 to 1200 μm.

20. The process as claimed in claim 1, wherein the membrane formed in step D) has a thickness of from 15 to 400 μm and is self-supporting.

21. The process as claimed in claim 20, wherein the membrane formed in step D) has a thickness of from 20 to 200 μm.

22. The process as claimed in claim 21, wherein the membrane formed in step D) has a thickness of from 20 to 150 μm.

23. The process as claimed in claim 1, wherein the membrane has a layer comprising a catalytically active component.

* * * * *